United States Patent [19]

Iijima

[11] 3,960,235

[45] June 1, 1976

[54] TRANSMISSION LOCKING SYSTEM
[75] Inventor: Tetsuya Iijima, Tokyo, Japan
[73] Assignee: Nisan Motor Co., Ltd., Yokohama, Japan
[22] Filed: Dec. 23, 1974
[21] Appl. No.: 535,682

[30] Foreign Application Priority Data
Dec. 24, 1973  Japan............................. 48-143579

[52] U.S. Cl............................ 180/82 A; 180/82 C; 180/101
[51] Int. Cl.² ................... B60R 21/10; B60R 25/06
[58] Field of Search................ 180/82 A, 82 C, 101, 180/102, 103; 340/52 E, 52 F, 278; 307/105 B; 200/61.58 B

[56] References Cited
UNITED STATES PATENTS

| | | |
|---|---|---|
| 1,675,465 | 7/1928 | Roehrich............................ 340/52 F |
| 1,805,088 | 5/1931 | Hardesty............................ 180/82 A |
| 3,438,455 | 4/1969 | Redmond........................... 180/82 C |
| 3,729,059 | 4/1973 | Redmond........................... 180/82 C |
| 3,859,625 | 1/1975 | Eggert................................ 180/82 C X |
| 3,864,668 | 2/1975 | Bickford............................ 180/82 C X |
| 3,870,120 | 3/1975 | Blinkilde........................... 180/82 C |

Primary Examiner—M. H. Wood, Jr.
Assistant Examiner—Terrance L. Siemens

[57] ABSTRACT

The transmission of a parked vehicle is locked in the neutral gear by a solenoid plunger. An electric circuit including elements such as AND, NOT, OR, and Bistable Memory responds to retract the plunger when it receives simultaneously a signal indicating that the driver is seated and another signal indicating that the seated driver has fastened his seat belt.

6 Claims, 7 Drawing Figures

TRANSMISSION LOCKING SYSTEM

The present invention relates generally to a transmission locking system for a motor vehicle and particularly to a system for locking a transmission of a motor vehicle in a parking or neutral position if the driver fails to carry out a precautionary safety procedure to protect himself such as fastening his seat belt to compel the driver to carry out the precautionary procedure before driving the vehicle.

Motor vehicles are at present required by law in many countries to be equipped with seat belts. The purpose of this is to prevent the driver and occupant of the vehicle from being thrown forward from his seat in the event of a collision of the vehicle to protect the driver and occupant from injury in a collision with structural parts of the vehicle which is called the "second collision". However, many drivers and occupants fail to fasten the seat belts because of the troublesome steps or procedures required for fastening the seat belts and discomfortable oppression on bodies of the occupants after fastening them. Thus, in fact most of the seat belts are merely provided for use but most of the vehicles are started and driven with the seat belts being unfastened by the occupants.

As an attempt to force vehicle occupants to fasten seat belts, a device has been proposed which, when equipped in a motor vehicle, generates a warning signal and simultaneously inhibits the engine from starting if the vehicle driver fails to fasten his seat belt. Thus, the device has an inconvenience in that manipulation and inspection of the engine and the vehicle for starting the engine is impossible unless the driver fastens his seat belt, with the result that the seat belt restrains movements required of the driver for performing manipulation and inspection of the engine and the vehicle.

It is, therefore, an object of the invention to provide a system for locking a transmission of a motor vehicle in a parking or neutral position if the driver fails to carry out a precautionary safety procedure or steps to protect him such as fastening the seat belt to compel the driver to carry out the precautionary safety procedure or steps but by which starting of the engine of the vehicle is possible without carrying out the precautionary safety procedure or steps.

It is a further object of the invention to provide a system for locking a transmission of a motor vehicle in a parking or neutral position even when the seat belt is in a condition in which members of the seat belt are engaged with each other although the driver fails to fasten the seat belt.

These and other objects and advantages of the invention will become more apparent from the following detailed description taken in conjunction with the accompanying drawings in which.

Figure 1:
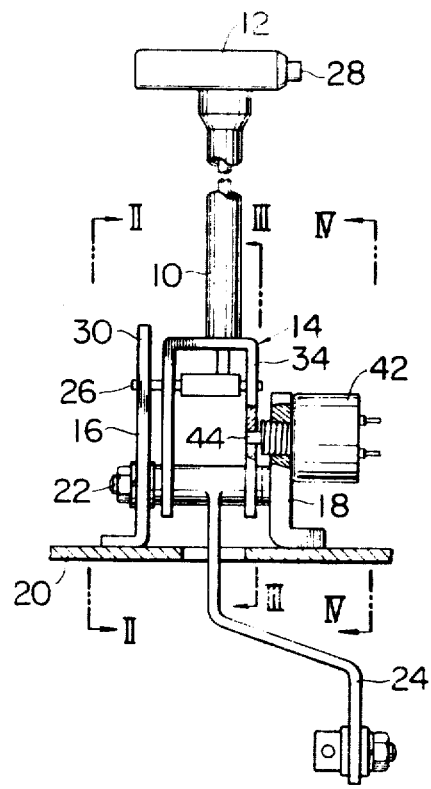
FIG. 1 is a schematic view, partly in cross section, of a preferred embodiment of a part of a transmission locking system according to the invention.
Figure 2:
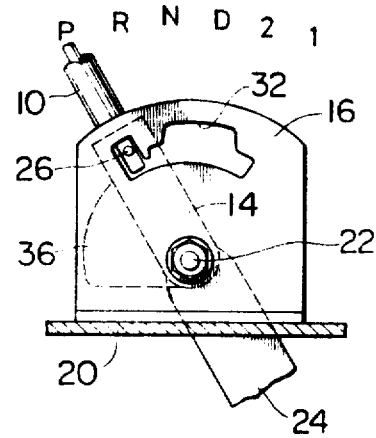
FIG. 2 is a schematic side view of a part of the transmission locking system taken substantially along a line II—II of FIG. 1.
Figure 3:
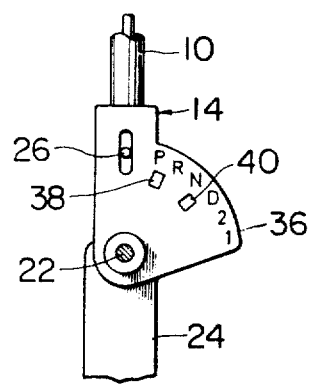
FIG. 3 is a schematic side view of a part of the transmission locking system taken substantially along a line III—III of FIG. 1.
Figure 4:
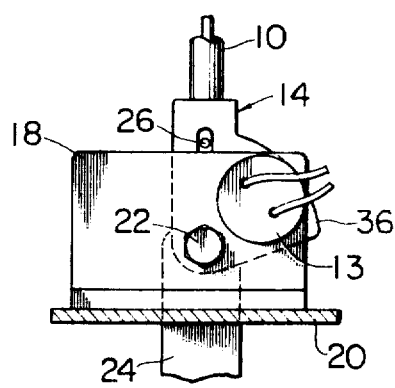
FIG. 4 is a schematic side view of a part of the transmission locking system taken substantially along a line IV—IV of FIG. 1.

Referring to FIGS. 1 to 4, a part of an automatic power transmission of a motor vehicle is shown to include a manually operated gear ratio selector lever 10 which has a hand grip 12 at its upper end and a clevis 14 at its lower end. First and second brackets 16 and 18 spaced apart from each other are fixedly mounted on the floor 20 of the vehicle and rotatably support a shaft 22 to which the clevis 14 is fixedly secured. The selector lever 10 is swingable around the axis of the shaft 22 by manipulating the hand grip 12 and has its angular positions P (parking), R (reverse), N (neutral), D (automatically shifting forward driving gear ratios), 2 (lock up 2nd gear) and 1 (lock up 1st gear) as shown by solid letters in FIG. 2. A linking lever 24 is fixedly connected with the shaft 22 and extends to a manual selector valve of a hydraulic control system (not shown) of the transmission, so that swinging movement of the selector lever 10 causes gear changing operation of the transmission. The selector lever 10 has a rod 26 which extends parallel to the shaft 22 and which is movable in an axial direction of the selector lever 10. The rod 26 is moved downward in the drawing by pushing a nob 28 provided on the hand grip 12. A positioning plate 30 is provided integral with the bracket 16 and is formed therein with an angularly extending aperture 32 into which the rod 26 is inserted to retain the selector lever 10 in a selected position as is well known in the art. The clevis 14 has a side member 34 which is formed integrally with a locking plate 36 constituting a part of a transmission locking system according to the invention. The locking plate 36 has its positions P, R, N, D, 2 and 1 as shown by solid letters in FIG. 3 which correspond to the positions P. R, N, D, 2 and 1 of the selector lever 10 set forth above. The locking plate 36 has first and second apertures 38 and 40 which are formed in locations corresponding to the positions P and N of the locking plate 36 as shown in FIG. 3. A solenoid 42 is fixedly mounted on the bracket 18 and has a projection or plunger 44 which extends from a core (not shown) of the solenoid 42 and which is in alignment with the apertures 38 and 40 of the locking plate 36 when the locking plate 36 is in the parking and neutral positions P and N. The projection 44 has retracted and protruded positions and is moved from the retracted position into the protruded position when the solenoid 42 is energized. The projection 44 engages the aperture 38 or 40 of the locking plate 36 when in the protruded position and when the locking plate 36 is in the parking or neutral position P or N to lock the selector lever 10 and accordingly also the transmission in the parking or neutral position P or N to prevent the transmission from being shifted into a driving gear. The projection 44 disengages from the apertures 38 and 40 of the locking plate 36 when in the retracted position to permit the selector lever 10 and accordingly also the transmission to be shifted into a driving gear.

Figure 5:
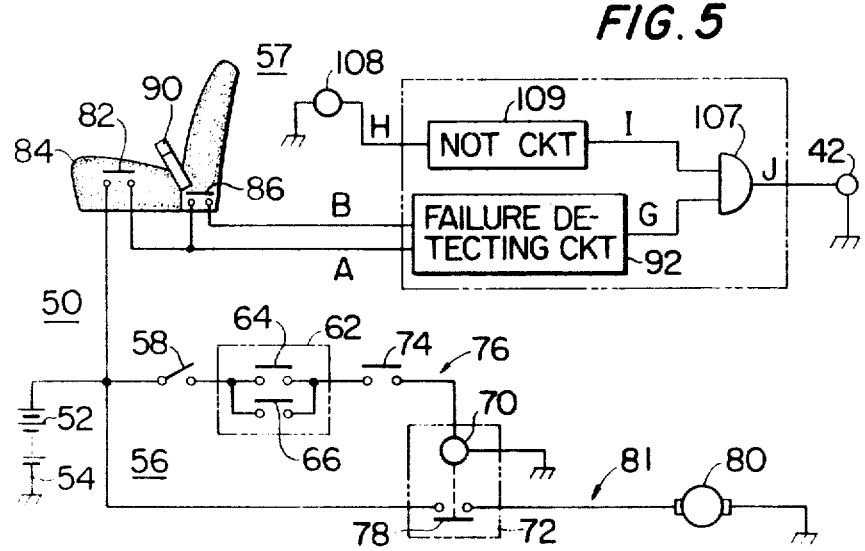
FIG. 5 is a circuit diagram of a preferred emboidment of an electric control circuit forming a part of a transmission locking system according to the invention.

Referring to FIG. 5, an electric control circuit 50 of the transmission locking system according to the invention is shown to comprise a d.c. power source such as the vehicle battery 52 the negative terminal of which is grounded through a line 54. The electric control circuit 50 comprises also an engine starting control circuit 56 which controls starting of the engine and a transmission locking control circuit 57 which controls the solenoid 42. The engine starting control circuit 56 comprises an ignition switch 58 which is connected with the positive terminal of the power source 52. The ignition switch 58 is normally open and closed for producing sparks in the engine cylinders. The ignition switch 58 is connected in series with a parallel connection or section 62 of a parking switch 64 and a neutral switch 66. The parking switch 64 is normally open and closed when the manual selector lever 10 is in its parking position P. The neutral switch 66 is normally open and closed when the manual selector lever 10 is in its neutral position N. The parallel section 62 of the parking and neutral switches 64 and 66 is connected with a starter relay coil 70 of a starter relay 72 through a starter switch 74. The starter switch 74 is normally open and manually closed for starting the engine. One terminal of the relay coil 70 is grounded. The relay coil 70 is energized when the switch 58, one of the switches 64 and 66, and the switch 74 are closed. The switch 58, parallel section 62, switch 74 and relay coil 70 from a starter motor control circuit 70. The engine starting control circuit 56 also comprises a starter relay switch 78 of the starter relay 72. The relay switch 78 is connected with the positive terminal of the power source 52 and with a starter motor 80. The relay switch 78 is normally open and closed when the relay coil 70 is energized to operate the starter motor 80 to start the engine. One terminal of the starter motor 80 is grounded. The switch 78 and starter motor 80 form a starter motor circuit 82. It will be understood that the engine can be started only when the selector lever 10 and accordingly also the transmission are in the parking or neutral position P or N.

The transmission locking control circuit 57 comprises a switch 82 which is connected with the positive terminal of the power source 52. The switch 82 is normally open and closed to produce an output signal A when the driver (not shown) of the vehicle sits down on his seat 84 thereof. The switch 82 is connected in series with a switch 86 which is closed when the driver fails to carry out a precautionary safety procedure or steps for protecting the driver such as fastening a driver restraining device such as a seat belt 90 which is provided in the vehicle to encircle the driver for his protection and safety, or rendering or maintaining a driver restraining device of the passive or automatic type operative or effective which is adapted to be automatically fastened around the driver when he sits down on his seat and concurrently when the device is operative. The switch 86 produces an output signal B when closed with the switch 82 closed. The switch 86 is opened when the driver carries out the precautionary safety procedure or steps. The switches 82 and 86 are connected in series with a failure detecting circuit 92 shown in detail in FIG. 6.

Figure 6:
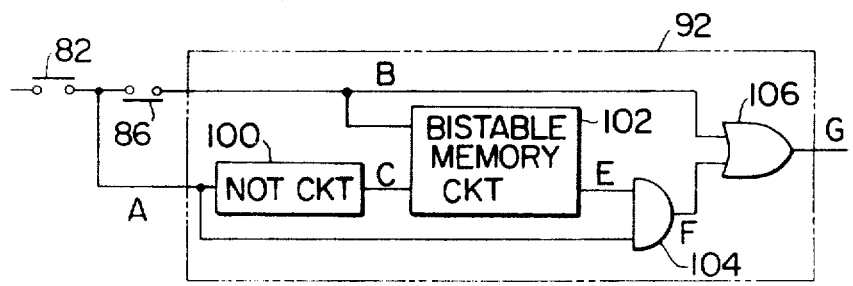
FIG. 6 is a circuit diagram of a failure detecting circuit forming a part of the electric control circuit shown in FIG. 5.

As shown in FIG. 6, the failure detecting circuit 92 comprises a first NOT circuit 100 to which the output signal A of the switch 82 is applied. The NOT circuit 100 produces no output signal when the output signal A of the switch 82 is present but produces an output signal C when the output signal A of the switch 82 is absent. The output signal C of the NOT circuit 100 is applied to a bistable memory circuit 102 to which the output signal B of the switch 86 is also applied. The bistable memory circuit 102 is set by the output signal C of the NOT circuit 100 to produce an output signal E and is reset by the output signal B of the switch 86 to cease generation of the output signal E. The output signal E of the bistable memory circuit 102 is applied to an AND gate logic circuit 104 to which the output signal A of the switch 82 is also applied. The AND gate circuit 104 produces an output signal F only when the output signal A of the switch 82 and the output signal E of the bistable memory circuit 102 are concurrently present. The output signal F of the AND gate circuit 104 is applied to an OR gate logic circuit 106 to which the output signal B of the switch 86 may also be applied. The OR gate circuit 106 produces the output signal G when only one of the output signal B of the switch 86 and output signal F of the AND gate circuit 104 is present.

Returning to FIG. 5, the output signal G of the OR gate circuit 106 is applied to an AND gate logic circuit 107 which is connected with the solenoid 42. A sensor 108 is provided which responds to vehicle speed to produce an output signal H. One terminal of the sensor 108 is grounded. The output signal H of the sensor 108 is applied to a second NOT circuit 109 which produces no output signal when the output signal H of the sensor 108 is present, that is, when the vehicle runs and which produces an output signal I when the output signal H of the sensor 108 is absent, that is, when the vehicle stops. The output signal I of the NOT circuit 109 is applied to the AND gate circuit 107. The AND gate circuit 107 produces an output signal J only when the output signal G of the OR gate circuit 106 of the failure detecting circuit 92 and the output signal I of the NOT circuit 109 are concurrently present. The output signal J of the AND gate circuit 107 is applied to the solenoid 42 to energize it to lock the selector lever 10 and accordingly the transmission in the parking or neutral position P or N.

The operation of the transmission locking system according to the invention thus constructed is as follows:

When the driver does not sit in his seat in the vehicle, the switch 82 is open and the switch 86 is closed so that no output signals A and B are produced and the NOT circuit 100 produces the output signal C. The bistable memory circuit 102 is set by the output signal C to provide the output signal E which is applied to the AND gate circuit 104. Since the output signal A is absent, the AND gate circuit 104 produces no output signal F. Since the output signal B and F are absent, the OR gate circuit 106 produces no output signal G. Thus, the solenoid 42 is de-energized so that the manual selector level 10 is shiftable from the parking or neutral position P or N to a driving gear.

When the driver sits down on his seat 84 but fails to carry out the precautionary safety procedure or steps, the switch 82 is closed so that the output signals A and B are produced and the NOT circuit 100 produces no output signal C. The bistable memory circuit 102 is reset by the output B of the switch 86 to cease to produce the output signal E. As a result, the AND gate circuit 104 produces no output signal F. Since the output signal B of the switch 86 is present, the OR gate circuit 106 produces the output signal G which is applied to the AND gate circuit 107. Since the vehicle is at a standstill, the sensor 108 produces no output signal H so that the NOT circuit 109 produces the output signal I which is applied to the AND gate circuit 107. Thus, the AND gate circuit 107 produces the output signal J so that the solenoid 42 is energized to lock the manual selector lever 10 in its parking or neutral position P or N. In this instance, when the ignition and starter switches 58 and 74 are closed and the selector lever 10 is in one of the parking or neutral positions P or N, the relay coil 70 is energized to close the relay switch 78 so that the starter motor 80 is operated to start the engine. When the selector lever 10 is in one of the positions R, D, 2 and 1, it can be shifted into and locked in the parking or neutral position P or N to allow starting of the engine.

In this condition, when the driver carries out the precautionary safety procedure or steps, the switch 86 is opened so that no output signal B is produced. Since the output signals B and F are absent, the OR gate circuit 106 produces no output signal G. Thus, the solenoid 42 is de-energized to allow the selector lever 10 to be shifted from the parking or neutral position P or N to a driving gear. In this state, if the driver ceases to carry out the precautionary safety procedure or steps, the switch 86 is closed so that the output signal B is produced. As a result, the OR gate circuit 106 produces the output signal G and then the AND gate circuit 107 produces the output signal J which is applied to the solenoid 42. Thus, the solenoid 42 is energized to lock the selector lever 10 in the parking or neutral position P or N.

When the driver does not take his seat in the vehicle and the seat belt 90 is in a condition in which component elements thereof are engaged with each other as if the driver would have fastened the seat belt 90, the switches 82 and 86 are opened so that no output signals A and B are produced. As a result, since the NOT circuit 100 produces the output signal C, the bistable memory circuit 102 is set by the output signal C to produce the output signal E. Since the AND gate circuit 104 produces no output signal F, the OR gate circuit 106 produces no output signal G and therefore the solenoid 42 is de-energized.

In this state, when the driver sits down on his seat, the switch 82 is closed with the switch 86 open so that the output signal A is produced and the output signal B remains absent. As a result, the NOT circuit 100 produces no output signal C and the bistable memory circuit 102 continues to produce the output signal E. Since the output signals A and E are present, the AND gate circuit 104 produces the output signal F. Accordingly, the OR gate circuit 106 produces the output signal G and then the AND gate circuit 107 produces the output signal J. Thus, the solenoid 42 is energized so that the selector lever 10 is locked in the parking or neutral position P or N.

In this state, when the driver disengages the component elements of the seat belt 90 from each other, the switch 86 is closed so that the output signal B is produced. The bistable memory circuit 102 is reset by the output signal B to cease to produce the output signal E. Therefore, the AND gate circuit 104 produces no output signal F. Since the output signal B is present, the OR gate circuit 106 produces the output signal G. Accordingly, the AND gate circuit 107 produces the output signal J. Thus, the solenoid 42 remains energized.

In this state, when the driver fastens the seat belt 90, the switch 86 is opened so that no output signal B is produced. The bistable memory circuit 102 continues to produce no output signal E and accordingly the AND gate circuit 104 produces no output signal F. As a result, the OR gate circuit 106 produces no output signal G. Accordingly, the AND gate circuit 107 produces no output signal J. Thus, the solenoid 42 is deenergized to allow shifting of the selector lever 10 from the parking or neutral position P or N to a driving gear.

When the driver unseats from his seat 84 and continues to carry out the precautionary safety procedure or steps, the switch 82 is opened so that no output signal A is produced. Accordingly, the NOT circuit 100 produces the output signal C. The bistable memory circuit 102 is set by the output signal C to provide the output signal E.

In this state, when the driver sits down on his seat 84, the switch 82 is closed so that the output signal A is produced. Therefore, the NOT circuit 100 produces no output signal C and the bistable memory circuit 102 continues to produce the output signal E. Since the output signal A and E are present, the AND gate circuit 104 produces the output signal F. Accordingly, the OR gate circuit 106 produces the output signal G. As a result, the AND gate circuit 107 produces the output signal J to energize the solenoid 42.

In this state, when the driver cease to carry out the precautionary safety procedure or steps, the switch 86 is closed so that the output signal B is produced. The bistable memory circuit 102 is reset by the output signal B to cease to produce the output signal E and the OR gate circuit 106 produces the output signal G. Thus, the solenoid 42 remains energized.

In this state, when the driver carries out the precautional safety procedure or steps, the switch 86 is opened so that no output signal B is produced. Accordingly, the OR gate circuit 106 produces no output signal G. Thus, the solenoid 42 is de-energized to allow shifting of the selector lever 10 from the parking or neutral position P or N to a driving gear.

When the vehicle runs with the driver carrying out the precautionary safety procedure or steps, the sensor 108 produces the output signal H so that the NOT circuit 109 produces no output signal I. Accordingly, the AND gate circuit 107 produces no output signal J. As a result, even if the driver erroneously or unitentionally ceases to carry out the precautionary safety procedure or steps and shifts the selector lever 10 into the parking or neutral position P or N during running of the vehicle, the selector lever 10 is prevented from being locked in the parking or neutral position P or N.

Figure 7:
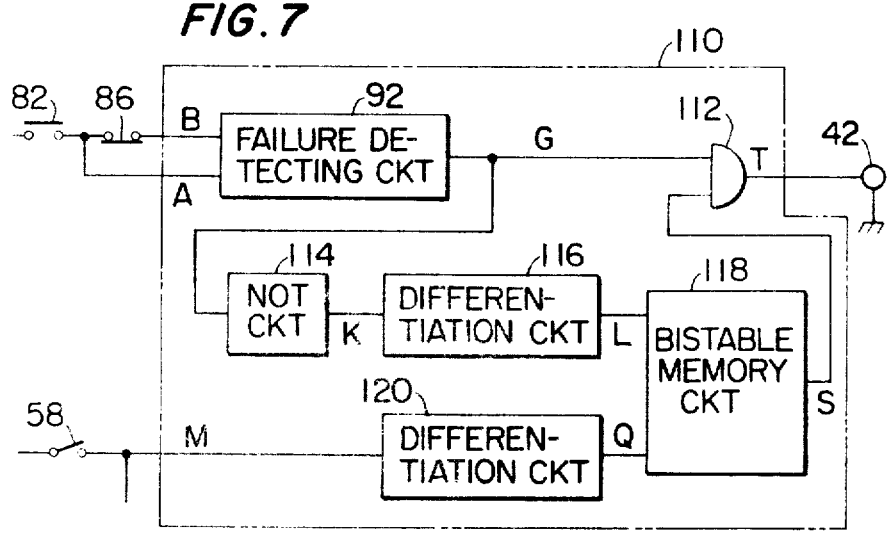
FIG. 7 is a circuit diagram of another preferred embodiment of a transmission locking control circuit forming a part of the electric control circuit shown in FIG. 5.

FIG. 7 illustrates another preferred embodiment of a transmission locking control circuit forming a part of a transmission locking system according to the invention. As shown in FIG. 7, the transmission locking control circuit 110 comprises switches 82 and 86 and a failure detecting circuit 92 as described above with reference to and shown in FIG. 5. The output signal G of the failure detecting circuit 92 is applied to an AND gate logic circuit 112 which is connected with the solenoid 42a. The output signal G of the failure detecting circuit 92 is also applied to a third NOT circuit 114 which produces no output signal when the signal G is present but which produces an output signal K when the signal G is absent. The output signal K of the NOT circuit 114 is applied to a first differentiation circuit 116. The output signal K received by the differentiation circuit 116 is converted therein into an output signal L which represents the differential of the output signal K. If desired, the differentiation circuit 116 can be omitted. The output signal L of the differentiation circuit 116 is applied to a second bistable memory circuit 118. The ignition switch 58 which forms a part of the engine starting control circuit 56 is connected with a second differentiation circuit 120 and applies an output signal M thereto when closed. The output signal M received by the differentiation circuit 120 is converted therein into an output signal Q which represents the differentiation of the output signal M. If desired, the differentiation circuit 120 can be omitted. The output signal Q of the differentiation circuit 120 is applied to the second bistable memory circuit 118. The bistable memory circuit 118 is set by the output signal Q of the differentiation circuit 120 to produce an output signal S and is reset by the output signal L of the differentiation circuit 116 to cease to produce the output signal S. The output signal S is applied to the AND gate circuit 112 which produces an output signal T only when the output signal G of the failure detecting circuit 92 and the output signal S of the bistable memory circuit 118 are concurrently present. The output signal T of the AND gate circuit 112 is applied to the solenoid 42a to energize the same.

The operation of a transmission locking system comprising the transmission locking control circuit 110 thus constructed is as follows:

When the driver sits down on his seat 84 but fails to carry out the precautionary safety procedure or steps, the failure detecting circuit 92 produces the output signal G as described hereinbefore. The output signal G is applied to the AND gate circuit 112 and concurrently to the NOT circuit 114. Therefore, the NOT circuit 114 produces no output signal K. In this state, when the ignition switch 58 is closed, the output signal M is produced. The differentiation circuit 120 receives the output signal M and converts it into the output signal Q which is applied to the bistable memory circuit 118. The bistable memory circuit 118 is set by the output signal Q to produce the output signal S which is applied to the AND gate circuit 112. Accordingly, the AND gate circuit 112 produces the output signal T. Thus, the solenoid 42a is energized to lock the selector level 10 in the parking or neutral position P or N.

In this state, when the driver carries out the precautionary safety procedure or steps, the failure detecting circuit 92 produces no output signal G as described hereinbefore. As a result, the AND gate circuit 112 produces no output signal T. Thus, the solenoid 42a is de-energized to allow shifting of the selector lever 10 from the parking or neutral position P or N to a driving gear. In this instance, since the output signal G of the failure detecting circuit 92 is absent, the NOT circuit 114 produces the output signal K. The differentiation circuit 116 receives the output signal K and produces the output signal L. The bistable memory circuit 118 is reset by the output signal L to cease to produce the output signal S. As a result, even if the driver erroneously or unintentionally ceases to carry out the precautionary safety procedure or steps so that the failure detecting circuit 92 produces the output signal G, since the bistable memory circuit 118 produces no output signal S, the solenoid 42a remains de-energized. This means that once the ignition switch 58 is closed and the driver fails to carry out the precautionary safety procedure or steps, although the selector lever 10 is locked in the parking or neutral position P or N only once to force the driver to carry out the precautionary safety procedure or steps, the selector lever 10 is prevented from being locked in the parking or neutral position P or N twice and more times. In other words, there is no possibility or danger that the selector lever 10 is locked in the parking or neutral position P or N during running of the vehicle.

It will be appreciated that a transmission of a motor vehicle is locked in a parking or neutral position if the driver fails to carry out a precautionary safety procedure to protect him such as fastening the seat belt to force the driver to carry out the precautionary safety procedure before driving of the vehicle, by employing two switches, a NOT circuit, a bistable memory circuit, an AND gate circuit, an OR gate circuit and a solenoid.

It will be appreciated that a transmission of a motor vehicle is locked in a parking or neutral position even when the seat belt is in a condition in which members of the seat belt are engaged with each other as if the driver would have fastened his seat belt.

It will be appreciated that manipulation and inspection of a motor vehicle for starting the engine thereof is possible without fastening the seat belt.

Although the invention has been described as being applied to a transmission of an automatic shift type, the invention can be applied to a transmission of a manual shift type.

What is claimed is:

1. A transmission locking system for a motor vehicle, comprising electric locking means movable between a rest position to allow a transmission of the vehicle to be shifted into a driving gear and a locking position to lock said transmission in a neutral position in which the vehicle is unable to start to move, first sensing means sensing that the driver sits down on his seat of the vehicle to produce a first output signal and sensing that the driver is absent from his seat to produce a second output signal, second sensing means sensing that the driver fails to carry out a precautionary procedure for his safety and protection when said first sensing means produces said first output signal to produce an output signal, and an electric control circuit connected to said first and second sensing means and to said electric locking means and responsive to said output signal of said second sensing means to produce an output signal to move said electric locking means said rest position into said locking position, in which said electric control circuit comprises a first bistable memory circuit which is set by said second output signal of said first sensing means to produce an output signal and which is reset by said output signal of said second sensing means to cease to produce said output signal, a first AND gate circuit for producing an output signal only when said first output signal of said first sensing means and said output signal of said bistable memory circuit are concurrently present, and an OR gate circuit for producing an output signal when only one of said output signal of said second sensing means and said output signal of said AND gate circuit is present, said electrical locking means being moved from said rest position into said locking position to lock said transmission in said neutral position when said output signal of said OR gate circuit is present.

2. A transmission locking system as claimed in claim 1, in which said first sensing means comprises a switch which is normally open and closed to produce said first output signal when the driver sits down on his seat, and a NOT circuit which produces said second output signal when said first output signal is absent and said second sensing means comprises a switch which is normally closed to produce said output signal and opened when the driver carries out said precautionary procedure.

3. A transmission locking system as claimed in claim 1, in which said electric control circuit further comprises third sensing means for producing a third output signal when the vehicle stops and a fourth output signal when the vehicle runs, and a second AND gate circuit for producing an output signal only when said output signal of said OR gate circuit and said third output signal of said third sensing means are concurrently present, said electric locking means being moved from said rest position into said locking position when said output signal of said second AND gate circuit is present.

4. A transmission locking system as claimed in claim 3, in which said third sensing means comprises a sensor sensing vehicle speed to produce said fourth output signal, and a NOT circuit for producing said third output signal when said fourth output signal of said sensor is absent.

5. A transmission locking system as claimed in claim 1, in which said electric control circuit further comprises a NOT circuit for producing an output signal when said output signal of said OR gate circuit is absent, and a second bistable memory circuit which is set by an output signal produced by closing of an ignition switch for an engine of the vehicle to produce an output signal and which is reset by said output signal of said NOT circuit to cease to produce said output signal, and a second AND gate circuit for producing an output signal only when said output signal of said OR gate circuit and said output signal of said second bistable memory circuit are concurrently present, said electric locking means being moved from said rest position into said locking position when said output signal of said second AND gate circuit is present.

6. A transmission locking system as claimed in claim 1, in which said electric locking means comprises a locking plate which is connected with a manually operated gear selector lever of said transmission and which has an aperture formed in a location corresponding to said neutral position of said transmission and said selector lever, and a solenoid which is energized when said output signal of said OR gate circuit is present and which has a projection extending from a core of said solenoid and having said rest and locking positions, said projection being moved from said rest position into said locking position when said solenoid is energized to engage said aperture to lock said selector lever and said transmission in said neutral position.

* * * * *